R. MANCHA.
STORAGE BATTERY LOCOMOTIVE.
APPLICATION FILED OCT. 29, 1919.

1,337,610.

Patented Apr. 20, 1920.
4 SHEETS—SHEET 1.

INVENTOR

RAYMOND MANCHA,
by Bakewell Church ATTORNEYS.

R. MANCHA.
STORAGE BATTERY LOCOMOTIVE.
APPLICATION FILED OCT. 29, 1919.

1,337,610.

Patented Apr. 20, 1920.
4 SHEETS—SHEET 2.

INVENTOR
RAYMOND MANCHA,
by Bakewell & Church ATTORNEYS.

R. MANCHA.
STORAGE BATTERY LOCOMOTIVE.
APPLICATION FILED OCT. 29, 1919.

1,337,610.

Patented Apr. 20, 1920.
4 SHEETS—SHEET 3.

INVENTOR
RAYMOND MANCHA,
By Bakewell & Church ATTORNEYS.

R. MANCHA.
STORAGE BATTERY LOCOMOTIVE.
APPLICATION FILED OCT. 29, 1919.
1,337,610.
Patented Apr. 20, 1920.
4 SHEETS—SHEET 4.
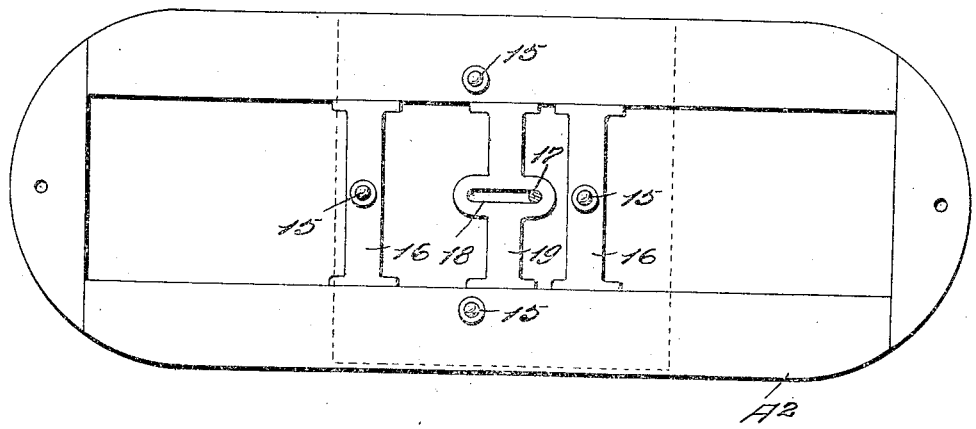
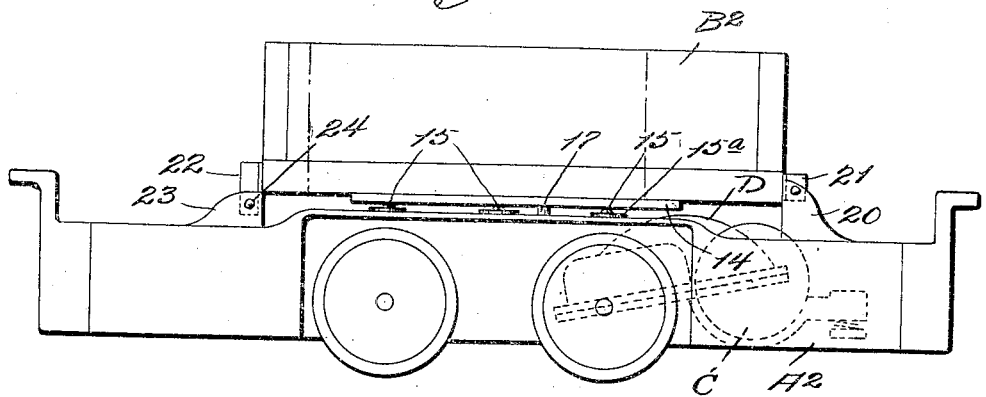
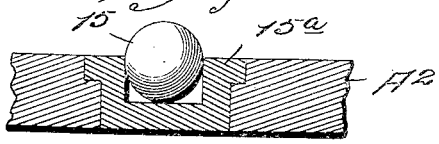
INVENTOR
RAYMOND MANCHA,
by Bakewell & Church, ATTORNEYS.

UNITED STATES PATENT OFFICE.

RAYMOND MANCHA, OF ST. LOUIS, MISSOURI, ASSIGNOR TO MANCHA STORAGE BATTERY LOCOMOTIVE COMPANY, OF ST. LOUIS, MISSOURI, A CORPORATION OF DELAWARE.

STORAGE-BATTERY LOCOMOTIVE.

1,337,610.     Specification of Letters Patent.     Patented Apr. 20, 1920.

Application filed October 29, 1919. Serial No. 334,336.

*To all whom it may concern:*

Be it known that I, RAYMOND MANCHA, a citizen of the United States, residing at St. Louis, Missouri, have invented a certain new and useful Improvement in Storage-Battery Locomotives, of which the following is a full, clear, and exact description, such as will enable others skilled in the art to which it appertains to make and use the same.

This invention relates to storage battery locomotives of the type in which the battery box projects over the motor and the gear case that houses the gears which are arranged between the motor and one of the wheel axles of the locomotive, such, for example, as a storage battery locomotive of the kind illustrated in my prior U. S. Patent No. 1,224,122, dated April 24, 1917.

The main object of my present invention is to provide a storage battery locomotive of the general type referred to which is so constructed that the motor and the gears can be inspected and repaired without the necessity of disassembling the locomotive or running it over a pit in which the workman making the repairs or inspection is located. To this end I have devised a storage battery locomotive having a battery box mounted on the frame of the locomotive in such a manner that said battery box can be moved easily from its normal position wherein it projects over the motor and gears into such a position that the motor and gears are exposed to view and are accessible from the upper side of the locomotive.

Figure 1 of the drawings is a top plan view of a storage battery locomotive constructed in accordance with my invention.

Fig. 7 is a top plan view, illustrating a storage battery locomotive embodying my invention but constructed slightly different from the forms of my invention illustrated in Figs. 1 and 5.

Fig. 8 is a side elevational view of the locomotive shown in Fig. 7, the battery box being shown in operative position; and Fig. 9 is a detail view of one of the spherical bearings on the locomotive frame that supports the plate which carries the battery box.

Figure 1:
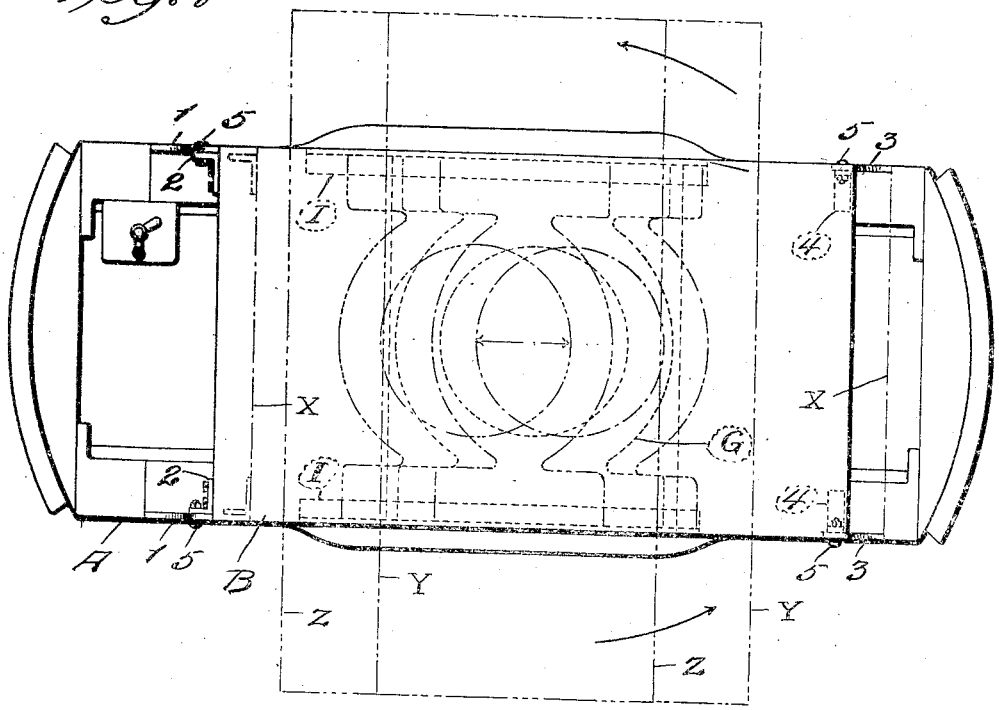
Figure 2:
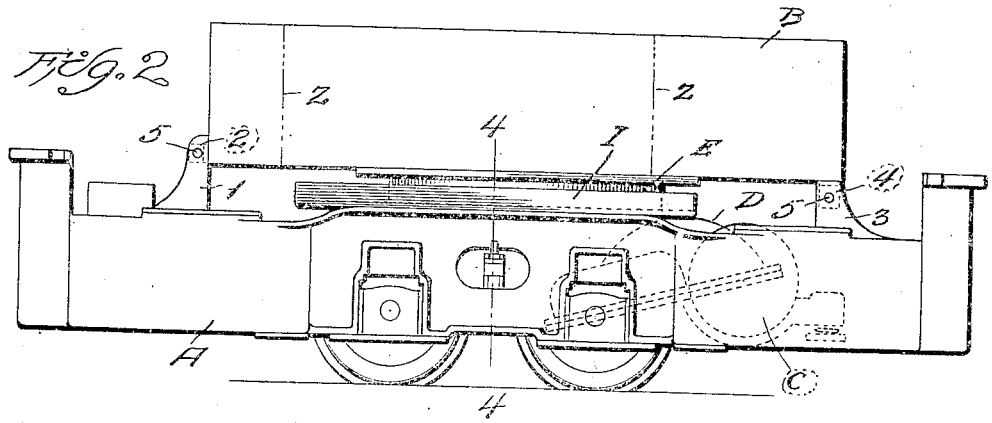
Fig. 2 is a side elevational view of said locomotive.
Figure 3:
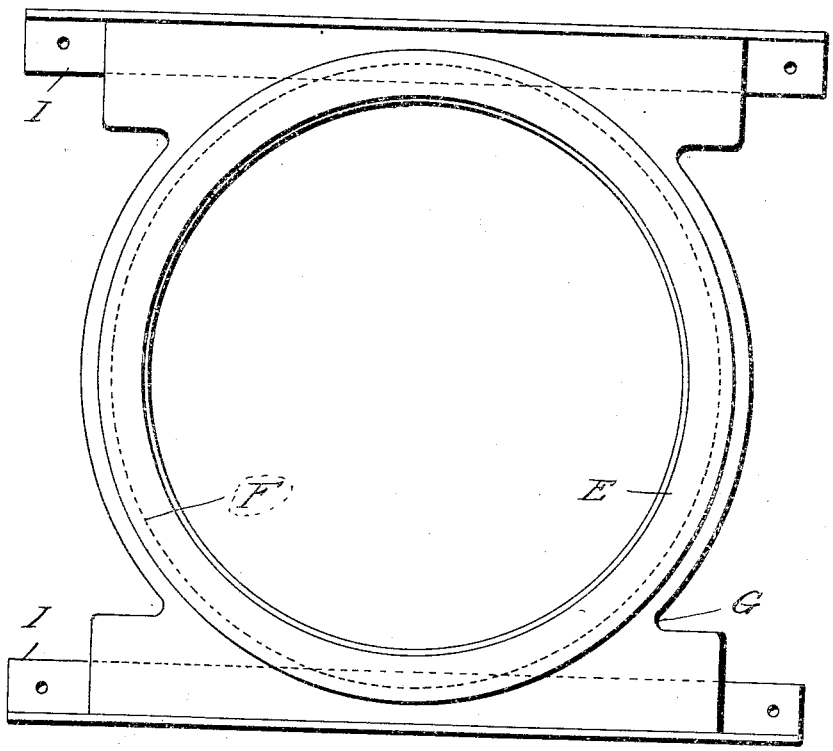
Fig. 3 is a top plan view of the turntable and the supporting structure on which said turntable is rotatably mounted.

Referring to Figs. 1 and 2 of the drawings, A designates the frame of the locomotive, which may be of any preferred construction, B designates the battery box, C the motor shown in broken lines in Fig. 2 and D the gear case that houses the gears which transmit motion from the motor to one of the wheel axles of the locomotive, said gear case also being illustrated in broken lines in Fig. 2. Normally, the battery box B occupies such a position that it projects over the motor and the gear case, as illustrated in full lines in Figs. 1 and 2. Said battery box is mounted on the frame of the locomotive, however, in such a manner that it can be moved relatively to same into such a position that the motor C and the gears in the gear case D are accessible from the upper side of the locomotive. This can be accomplished in various ways without departing from the spirit of my invention, and while I have herein illustrated several ways of accomplishing this desirable result, I wish it to be understood that my broad idea is not limited to the particular means herein illustrated for supporting the battery box, as my invention, broadly stated, consists of a storage battery locomotive having a battery box mounted on the frame of the locomotive in such a manner that it can be moved relatively to said frame into such a position that the motor and the gears are accessible from the upper side of the locomotive.

Figure 4:
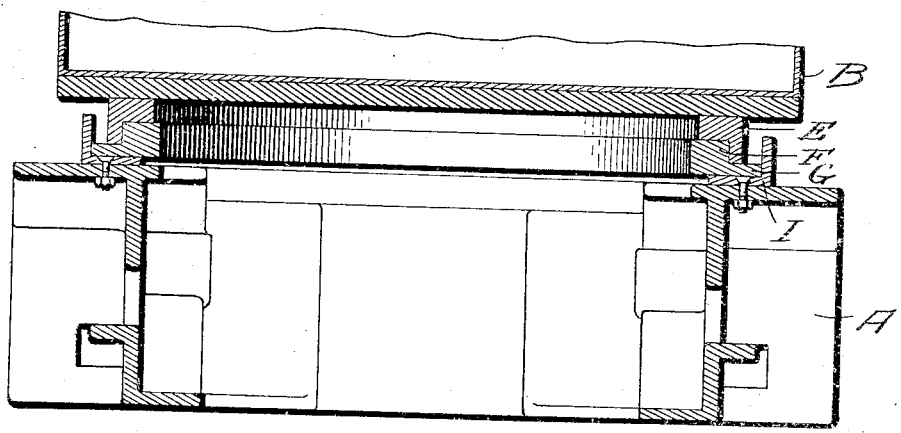
Fig. 4 is a transverse sectional view, taken on the line 4—4 of Fig. 2.

In the form of my invention illustrated in Figs. 1 to 4, inclusive, the battery box B is connected to a turnable formed by a substantially ring-shaped member E that is rotatably mounted on a support that can be shifted longitudinally of the frame A of the locomotive, the support just referred to having a ring-shaped portion F that fits in an annular groove in the underside of the turntable E, as shown in Fig. 4, and a pair of straight side flanges G that are slidingly mounted in tracks formed preferably by two angle shaped bars I that are connected to the upper sides of the side members of the locomotive frame, as shown in Fig. 4. The battery box B, which is of oblong shape, normally extends longitudinally of the locomotive frame, as shown in Fig. 2, said battery box being retained in the position mentioned by any suitable means, such, for example, as a pair of integral, upwardly-projecting arms 1 on the side members of the locomotive frame A that bear against one end of the battery box and coöperate with brackets 2 thereon and a pair of integral, upwardly-projecting arms 3 on the side members of the locomotive frame arranged adjacent the opposite end of the battery box and adapted to coöperate with depending brackets 4 on the underside of the battery box, as shown in Fig. 2. The brackets 2 on the end wall of the battery box and the depending brackets 4 on the bottom of the battery box are so arranged that they will fit between the upwardly-projecting arms or lugs 1 and 3, respectively, on the side members of the locomotive frame, and said lugs or arms are so designed and positioned that the arms 1 will serve as stops that prevent the battery box from moving longitudinally of the locomotive frame and the arms 3 will serve as supports on which one end portion of the battery box rests. Bolts or other suitable fastening devices 5 are provided for detachably connecting the brackets 2 and 4, on the battery box to the integral, upwardly-projecting arms 1 and 3, respectively, on the locomotive frame.

When it is desired to inspect or repair the motor or gears of the locomotive the fastening devices 5 are removed and the supporting structure F on which the turntable E is mounted is then moved longitudinally of the locomotive frame so as to disengage the brackets on the battery box from the coöperating parts 1 and 3 on the locomotive frame and move said battery box far enough away from the upwardly-projecting arms 1 to permit the battery box to be turned transversely of the locomotive frame by rotating the turntable E, the dot and dash lines $x$ in Fig. 1 indicating the position of the battery box after it has been shifted longitudinally of the locomotive frame and before said battery box has been turned. After the turntable E has been rotated so as to arrange the battery box transversely of the locomotive frame, as indicated by the dot and dash lines $y$ in Fig. 1, the supporting structure F on which the turntable E is mounted is moved bodily longitudinally of the locomotive frame so as to move the battery box into the position indicated by the dot and dash lines $z$ in Fig. 1. In this position the battery box will be located far enough to one side of the motor C and the gear case D to permit the motor and gears to be easily inspected or repaired, thus overcoming the necessity of disassembling the locomotive or running the locomotive over a pit in which the operator making the repairs or inspection is located. To restore the battery box D to its normal position the supporting structure F is first moved longitudinally of the locomotive frame to arrange the battery box in the position indicated by the dot and dash lines $y$, the turntable E is then rotated so as to arrange the battery box longitudinally of the locomotive frame in the position indicated by the dot and dash lines $x$, and said supporting structure F is then moved longitudinally in the opposite direction so as to bring the brackets 2 and 4 on the battery box into engagement with the integral, upwardly-projecting arms 1 and 3, respectively, on the locomotive frame with which said brackets coöperate, said parts being thereafter connected together by fastening devices 5.

Figure 5:
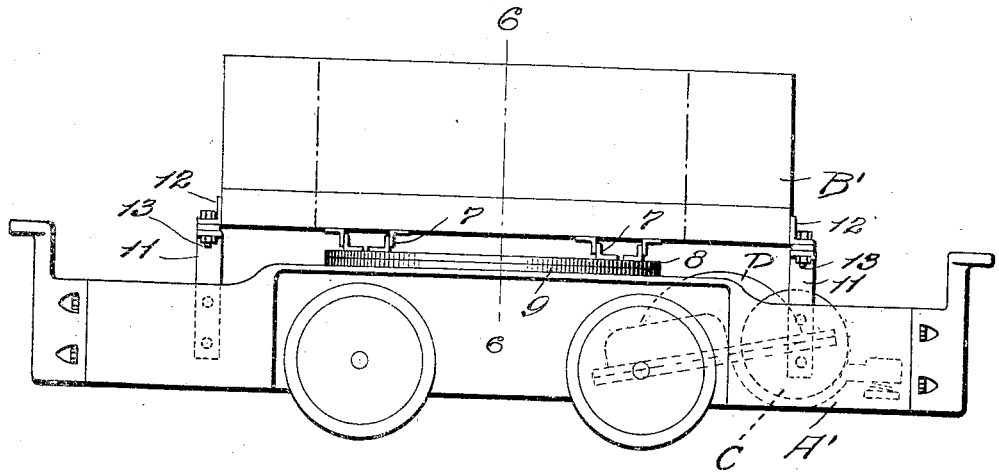
Fig. 5 is a side elevational view, illustrating a modification of my invention.
Figure 6:
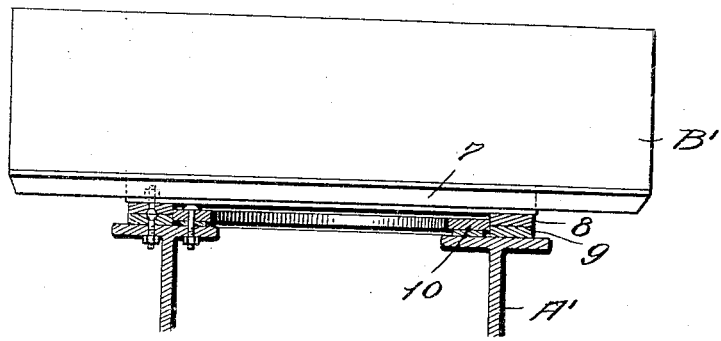
Fig. 6 is a transverse sectional view, taken on the line 6—6 of Fig. 5, the battery box being shown in elevation.

In Figs. 5 and 6 of the drawings I have illustrated another form of my invention wherein the battery box B' is carried by a pair of transversely-disposed supporting members 7 that are secured to a turntable formed by a ring-shaped member 8 that is rotatably mounted on a supporting structure carried by the locomotive frame and composed of a ring-shaped member 9 on which the ring-shaped member 8 rests, as illustrated in Fig. 6, and a ring-shaped member 10 connected to the locomotive frame and arranged inside of the coöperating ring-shaped members 8 and 9 in such a manner that it holds the members 8 and 9 in vertical alinement with each other. In this form of my invention the locomotive frame A' is provided with upwardly-projecting arms 11 that coöperate with brackets 12 on the end walls of the battery box, as shown in Fig. 5, said coöperating parts 11 and 12 being connected together by bolts or other suitable fastening devices 13. When the locomotive is constructed in this manner it is only necessary to turn the battery box B' into a position at substantially right angles to its normal position so as to gain access to the motor and to the gears.

In Figs. 7 and 8 of the drawings I have illustrated still another form of my invention which is similar in some respects to the form of my invention shown in Fig. 1, in that the battery box has to be moved longitudinally of the locomotive frame before it can be turned or swung into a position transversely of the locomotive frame. In the locomotive shown in Figs. 7 and 8 the battery box B² is connected to a horizontally-disposed plate 14 which rests upon a number of spherical shaped bearings 15 carried by the locomotive frame. As shown in Fig. 7, two spherical bearings 15 are mounted in socket members 15ª, set into the top faces of the side members of the locomotive frame A², and two similar bearings are mounted in transversely-disposed braces or cross members 16 connected to the side members of the locomotive frame. The plate 14 that carries the battery box B² is provided with a depending king bolt 17 that projects downwardly through an elongated slot 18 in a cross member 19 connected to the side members of the locomotive frame, as shown in Fig. 7. The locomotive frame is provided with a pair of upwardly-projecting arms 20 that coöperate with brackets 21 on one end of the battery box, and the opposite end of the battery box is provided with a pair of depending brackets 22 that coöperate with upwardly-projecting arms 23 on the locomotive frame, the brackets on the battery box being connected to the arms on the locomotive frame by means of fastening devices 24. The battery box B² normally occupies the position shown in full lines in Fig. 8 and when it is desired to inspect or repair the motor or the gears the battery box is first shifted longitudinally of the locomotive frame and then turned transversely of the locomotive frame, the spherical shaped bearings 15 on which the plate 14 slides making it possible to easily move the battery box into and out of its operative position.

Having thus described my invention, what I claim as new and desire to secure by Letters Patent, is:

1. A storage battery locomotive, comprising a frame, a motor on said frame for propelling the locomotive, a substantially oblong shaped battery box arranged longitudinally of said frame and normally positioned so that it projects over said motor, and means for enabling said battery box to be arranged transversely of the frame without disconnecting it from the frame so as to gain access to said motor.

2. A storage battery locomotive, comprising a frame, a motor on said frame for propelling the locomotive, and a battery box rotatably mounted on said frame and normally positioned so that a portion of same projects over said motor.

3. A storage battery locomotive comprising a frame, a motor mounted on said frame for propelling the locomotive, a substantially oblong shaped battery box rotatably mounted on the frame and normally arranged so that it extends longitudinally of the frame, and means for preventing said battery box from turning relatively to said frame.

4. A storage battery locomotive, comprising a frame, a motor on said frame for propelling the locomotive, and a battery box mounted on said frame in such a manner that it can be moved longitudinally of the frame and also turned relatively to the frame to enable said motor to be inspected or repaired from the upper side of the frame.

5. A storage battery locomotive, comprising a frame, a motor on said frame for propelling the locomotive, a battery box mounted on said frame in such a manner that it can be moved longitudinally of the frame and also turned relatively to the frame to enable said motor to be inspected or repaired from the upper side of the frame, stops on the frame that limit the longitudinal movement of said battery box in one direction, and means for preventing said battery box from turning relatively to the frame.

6. A storage battery locomotive, comprising a frame, a motor on said frame, a battery box that normally extends over said motor, and a turntable on said frame that carries said battery box.

7. A storage battery locomotive, comprising a frame, a battery box, a turntable on said frame that carries said battery box, and means for enabling said turntable to be moved longitudinally of the frame.

8. A storage battery locomotive, comprising a frame, a battery box, a supporting structure on said frame that can be shifted longitudinally of same, and a turntable on said supporting structure that carries the battery box.

9. A storage battery locomotive, comprising a frame, a battery box, longitudinally-disposed rails on said frame, a supporting structure slidingly mounted on said rails, and a rotatable member on said supporting structure that carries the battery box.

10. A storage battery locomotive, comprising a frame, a battery box, longitudinally-disposed rails on the side members of said frame, a supporting structure slidingly mounted on said rails and provided with a ring-shaped part, and a turntable on the underside of said battery box rotatably mounted on the ring-shaped part of said supporting structure.

11. A storage battery locomotive, comprising a frame, a motor on said frame, a battery box arranged above said motor, a ring-shaped member connected to the upper side of said frame, a coöperating ring-shaped member on the underside of the battery box rotatably mounted on the ring-shaped member on said frame, and means for holding said coöperating ring-shaped members in vertical alinement with each other.

12. A storage battery locomotive, comprising a frame, a motor on said frame, a battery box arranged above said motor, bearings on said frame that support said battery box and permit said battery box to be moved into a position transversely of the frame, and means for normally holding said battery box in longitudinal alinement with said frame.

RAYMOND MANCHA.